United States Patent
Tanaka et al.

[11] Patent Number: 6,160,603
[45] Date of Patent: Dec. 12, 2000

[54] LIQUID CRYSTAL MASK, LIQUID CRYSTAL LASER MARKER, AND MARKING METHOD USING THE SAME

[75] Inventors: Hirokazu Tanaka, Oyama; Tsuyoshi Ohkubo; Taku Yamazaki, both of Hiratsuka, all of Japan

[73] Assignee: Komatsu Ltd., Tokyo, Japan

[21] Appl. No.: 09/171,107

[22] PCT Filed: Apr. 8, 1997

[86] PCT No.: PCT/JP97/01199

§ 371 Date: Oct. 13, 1998

§ 102(e) Date: Oct. 13, 1998

[87] PCT Pub. No.: WO97/38820

PCT Pub. Date: Oct. 23, 1997

[30] Foreign Application Priority Data

Apr. 12, 1996 [JP] Japan .................................. 8-114327

[51] Int. Cl.⁷ ........................... G02F 1/1343; G02F 1/13; G02F 1/133; G09G 3/36; B41J 2/435
[52] U.S. Cl. .............................. 349/143; 349/2; 349/22; 345/103; 347/224
[58] Field of Search ............... 349/2–4, 19, 33, 349/22, 143; 219/121.73, 121.85, 121.68, 121.69; 345/87, 94, 103; 347/224, 256

[56] References Cited

U.S. PATENT DOCUMENTS

| Re. 35,446 | 2/1997 | Stone | 219/121.74 |
|---|---|---|---|
| 4,818,835 | 4/1989 | Kuwabara et al. | 219/121.6 |
| 5,260,542 | 11/1993 | Ishiguro et al. | 219/121.69 |
| 5,726,673 | 3/1998 | Tsuda et al. | 345/103 |
| 5,747,772 | 5/1998 | Matsumura et al. | 349/2 |
| 5,760,370 | 6/1998 | Tsuda et al. | 349/2 |
| 5,896,233 | 4/1999 | Soda et al. | 33/677 |
| 6,046,794 | 4/2000 | Ichihara | 355/40 |

FOREIGN PATENT DOCUMENTS

| 5-77067 | 3/1993 | Japan . |
|---|---|---|
| 5-200570 | 8/1993 | Japan . |
| 7-214364 | 8/1995 | Japan . |

*Primary Examiner*—William L. Sikes
*Assistant Examiner*—Tarifur R. Chowdhury
*Attorney, Agent, or Firm*—Sidley & Austin

[57] ABSTRACT

According to the present invention, no gap occurs in the joint between adjacent blocks when a design is marked in several blocks. In a liquid crystal laser marker for making a liquid crystal mask (2) with a plurality of pixels display a design to be marked on workpieces and for transmitting a laser beam through the liquid crystal mask to a workpiece so that the design will be marked on the workpiece, the liquid crystal mask is such that the pixels at all or part of the outermost sides have a size which is different from that of the inner pixels. The liquid crystal laser marker further includes a controller (11), when a design is divided into several blocks (1, 1, 1) and one of the blocks is displayed on the liquid crystal mask, the controller controls the liquid crystal mask such that a marking position of the block currently displayed on the liquid crystal mask overlaps a marking position of a block adjacent to the currently displayed block by a given length ($L_1$, $L_2$) of a portion where the outermost pixels have a size which is different from that of the inner pixels of the liquid crystal mask. A liquid crystal mask the pixels of which have the same size can be used. In this case, the controller controls the liquid crystal mask such that a marking position of a block currently displayed on the liquid crystal mask overlaps a marking position of a block adjacent to the currently displayed block by a given length ($L_3$, $L_4$) of a portion corresponding to part of the outermost pixels of the liquid crystal mask.

17 Claims, 6 Drawing Sheets

LIQUID CRYSTAL MASK, LIQUID CRYSTAL LASER MARKER, AND MARKING METHOD USING THE SAME

TECHNICAL FIELD

This invention relates to a liquid crystal laser marker using a liquid crystal mask and a marking method using the same.

BACKGROUND ART

One of the widely used laser markers that provide a laser beam for marking characters or figures on workpieces, such as semiconductor packages, is a so-called liquid crystal laser marker using a liquid crystal mask. In the liquid crystal laser marker, a design of the characters or figures to be marked is converted to dot information, e.g., where "0" indicates an unmarking portion and "1" indicates a marking portion, and is displayed on the liquid crystal mask having a given number of pixels in accordance with the dot information. Then a laser beam is directed to be incident on the liquid crystal mask and is transmitted through the pixels, corresponding to the characters or figures, to the surface of a workpiece so that the workpiece will be marked with the transmitted laser beam. Therefore, the more the number of pixels of the liquid crystal mask increases per unit area of the workpiece, the more the characters or figures can be marked smoothly with high resolution.

A conventional marking method for such a liquid crystal laser marker will be described with respect to FIGS. 14 to 17.

FIG. 14 is a schematic diagram showing an exemplary structure of the liquid crystal laser marker. In FIG. 14, the laser oscillator 21 can be a YAG laser oscillator, the output of which is a pulse train driven by a Q switch. A first deflector 23X, 23Y conducts the laser beam from the laser oscillator 21 to a liquid crystal mask 2 while deflecting it in given X and Y directions so that the liquid crystal mask 2 will be raster scanned. The first deflector comprises of an X-directional deflector or polygonal mirror 23X and a Y-directional deflector or galvanometer scanner 23Y, provided separately from each other. Such scanning directions, i.e., the X-axis scanned by rotating the polygonal mirror 23X and the Y-axis scanned by moving the galvanometer scanner 23Y, intersect at right angles. The polygonal mirror 23X is rotatable in several constant speed rotation modes, and the rotation mode is selected for each workpiece to be marked. Each plane of the polygonal mirror 23X corresponds to one line in the X-direction on the liquid crystal mask 2. On the other hand, the galvanometer scanner 23Y is operable with given steps of minute, equiangular deflections, and moves only by a minute deflection angle and stops there as the light-receiving point of the laser beam from the galvanometer scanner 23Y is changed from one plane to another by the rotation of the polygonal mirror 23X. Each of the minute deflection angles corresponds to one line feed in the Y-direction on the liquid crystal mask 2.

As shown in FIG. 15, the liquid crystal mask 2, called a transmission dispersion type liquid crystal mask, can be a liquid crystal device in which a given number of liquid crystal elements are arranged in a dot matrix. The liquid crystal elements constituting the liquid crystal mask 2 have the same size. Further, electrode lines, not shown, are arranged on both sides of the liquid crystal elements so as to be parallel on each side and to perpendicularly intersect between both sides. The electrode lines apply a given voltage to certain or specific liquid crystal elements to place them in a laser-beam transmission state. The other liquid crystal elements to which no voltage is applied are in a laser-beam scattered state. The liquid crystal elements arranged in the dot matrix are used as the pixels 3 of a design to be marked. Each of the pixels 3 is converted to dot information "0" or "1", where "0" indicates an unmarking portion and "1" indicates a marking portion. The given voltage is applied to the pixels 3 corresponding to the portions to be marked such dot information is displayed on the liquid crystal mask 2, so that the laser beam will be transmitted therethrough, thus marking a workpiece with the transmitted laser beam. As discussed above, the liquid crystal mask 2 serves as a light shutter for transmitting or intercepting a light beam in response to an external signal.

A second deflector 27X, 27Y conducts the laser beam from the liquid crystal mask 2 to a marked surface of a workpiece 30 and deflects it in given X and Y directions on the workpiece 30. The second deflector comprises an X-directional deflector or galvanometer scanner 27X and a Y-directional deflector or lens system 27Y, provided separately from each other. Such directions, i.e., the X-axis in which the laser beam is deflected by rotating the galvanometer scanner 27X and the Y-axis in which the laser beam is deflected by moving the lens 27Y in parallel to the workpiece 30, intersect at right angles. The laser beam transmitted through the liquid crystal mask 2 is conducted to the workpiece 30 via the galvanometer scanner 27X for X-directional deflection, an object lens 28, and the lens 27Y for Y-directional deflection. Thus, the design displayed on the liquid crystal mask 2 is marked on the workpiece 30. The lens 27Y for Y-directional deflection is set in a hole of a table 36 and is moved along with the table 36 in parallel to the surface of the workpiece 30. The table 36 is coupled through a link mechanism to an output shaft of a drive unit 35, such as an AC motor, and is driven by the drive unit 35 to move in parallel. The second deflector 27X, 27Y is in a stopped state until all of the pixels corresponding to the design on the liquid crystal mask 2 are raster scanned so that the laser beam transmitted through the liquid crystal mask 2 can be directed to a marking area of the design.

Further, optical systems for gathering or condensing laser light are arranged within incidence paths to the first deflector 23X, 23Y and to the second deflector 27X, 27Y, respectively. Such condenser optical systems are effective in condensing incident light when the beam has large diameter or deflection angle, thus reducing any occurrence of modification of the mark or dispersion or loss of laser light.

The condenser optical system for the first deflector 23X, 23Y is constituted of a relay lens (e.g., beam splitter) 22 between the laser oscillator 21 and the galvanometer scanner 23Y, and a relay lens 24 between the galvanometer scanner 23Y and the polygonal mirror 23X. The relay lens 22 gathers or condenses the laser beam from the laser oscillator 21 onto the reflection plane of the galvanometer scanner 23Y, while the relay lens 24 gathers the deflected beam from the galvanometer scanner 23Y to a point on each plane of the polygonal mirror 23X. The laser beam from the polygonal mirror 23X to the liquid crystal mask 2 is thus made uniform for raster scanning.

The condenser optical system for the second deflector 27X, 27Y is constituted by a relay lens (e.g., field lens) 25, arranged between the polygonal mirror 23X and the galvanometer scanner 27X and close to the liquid crystal mask 2. The relay lens 25 alters the raster-scanned beam from the polygonal mirror 23X into parallel rays, and the galvanometer scanner 27X reflects the parallel rays. The relay lens 25 can be arranged on the incidence side of the liquid crystal mask 2, as shown in FIG. 14, or on the emission side or on both sides.

A controller 11 is such a computer system that mainly has a microcomputer. The controller 11 is connected to the liquid crystal mask 2, the drive unit 32 for the polygonal mirror 23X, the Q switch for the laser oscillator 21, the drive unit 31 for the galvanometer scanner 23Y, the drive unit 34 for the galvanometer scanner 27X, and the drive unit 35 for the lens 27Y, respectively. These elements or units are controlled by the controller 11.

FIG. 16 shows an exemplary design to be marked. When the design is larger than the number of pixels on the liquid crystal mask 2, marking with one emission of the laser beam causes lowered resolution of the marked design, and hence rough characters or lines. In such a case, it is necessary to use the liquid crystal mask 2 several times for a reduced design area (hereinafter, referred to as a block) to be marked with one emission of the laser beam. For example, the overall design is divided into two blocks 1 in lateral and vertical directions, respectively. Then a design portion corresponding to each respective divided block 1 is displayed on the liquid crystal mask 2, and is marked in position on the workpiece 30 one by one. After all of the individual blocks 1 have been marked, the blocks 1 are synthesized and the overall design is completely marked.

Stated more particularly, a block 1 is first selected from among all of the blocks 1 during the condition that the oscillating power of the laser oscillator 21 is turned off by the Q switch. The design portion of the selected block 1 is displayed on the liquid crystal mask 2 as dot information "0" and "1". The first deflector 23X, 23Y is driven to move to and stop at a position from which the raster scanning is started, while the second deflector 27X and 27Y is driven to move to and stop in a marking area corresponding to the marking position of the selected block 1. Then the laser oscillator 21 is turned ON by the Q switch to output pulses, and the first deflector 23X, 23Y is driven so that the design portion on the liquid crystal mask 2 will be raster scanned. The selected block 1 is thus marked on the workpiece 30.

The above process is performed for the other blocks 1 sequentially and repeatedly until the overall design is marked on the workpiece 30.

In the conventional art, a design portion of each block 1 is displayed on the liquid crystal mask 2 and is marked on the workpiece 30 as discussed above.

However, with such a conventional technique, a character or figure may be divided into different blocks 1. In this case, the identical character or figure must be marked on the workpiece 30 several times.

It is therefore necessary to coincide the joints of adjacent blocks with each other when marking the identical character or figure several times, but such an adjustment is difficult because of various factors, such as a play of the second deflector 27X and 27Y, the changes in the position of optical elements, and a change of a control signal due to external noise, and a gap may occur in the joint between adjacent blocks. In FIG. 16, a character "I" is divided into two parts. FIG. 17A shows a state where the divided character "I" has been marked normally, whereas FIG. 17B shows the character "I" marked in the condition that a gap occurs in the joint between the two blocks 1. As shown in FIG. 17B, the gap between the blocks 1 causes a portion in which no laser beam is irradiated, and hence a break in the character or figure. As a result, a problem arises in that the visibility of the marked design is lowered.

SUMMARY OF THE INVENTION

The present invention has been made in consideration of the above problem, and an object thereof is to provide a liquid crystal mask, a liquid crystal laser marker, and a marking method using the same, which prevent occurrence of a gap in a joint between adjacent blocks when a design is marked in several blocks.

A first aspect of the present invention provides a liquid crystal mask with a plurality of pixels, mounted in a liquid crystal laser marker for making the pixels display a design to be marked on workpieces and for transmitting a laser beam through the pixels to a workpiece so that the design displayed on the pixels will be marked on the workpiece, wherein the liquid crystal mask is a liquid crystal device in which the pixels at all or part of the outermost sides, out of all of the pixels, have a size which is different from that of the inner pixels.

A fourth aspect of the present invention provides a liquid crystal laser marker for making a liquid crystal mask, with a plurality of pixels, display a design to be marked on workpieces and for transmitting a laser beam through the liquid crystal mask to a workpiece so that the design will be marked on the workpiece, wherein the pixels at all or part of the outermost sides have a size which is different from that of the inner pixels.

A tenth aspect of the present invention provides a marking method for making a liquid crystal mask, with a plurality of pixels, display a design to be marked on workpieces and for transmitting a laser beam through the liquid crystal mask to a workpiece so that the design will be marked on the workpiece, wherein the pixels at all or part of the outermost sides or at least one side of the liquid crystal mask have a size which is different from that of the inner pixels such that the design is marked without distortion of the outermost optics.

According to the first, fourth and tenth aspects of the present invention, the liquid crystal mask is a liquid crystal device in which the outer pixels, at all or part of the outermost sides, have a size which is different from that of the inner pixels. When a design is divided into several blocks and each of the blocks is marked via the liquid crystal mask, the adjacent blocks are overlapped in a portion where the different sized outer pixels are lined up. The size of such outer pixels can be set by taking into account various factors, such as the play of the second deflector, the changes in position of optical elements, and a change of a control signal due to external noise. This makes it possible to prevent an occurrence of a gap in the joint between adjacent blocks, and hence an occurrence of unmarked portions. Accordingly, high visibility of the marked design can be obtained even if the design is marked in several blocks.

A fifth aspect of the present invention provides a liquid crystal laser marker based on the fourth aspect of the present invention, wherein the liquid crystal laser marker further includes a controller, so that when a design is divided into several blocks and one of the blocks is displayed on the liquid crystal mask, the controller controls the liquid crystal mask such that a marking position of the block, currently displayed on the liquid crystal mask, overlaps a marking position of a block adjacent to the currently displayed block by a given length of a portion where the outermost pixels have a size which is different from that of the inner pixels of the liquid crystal mask.

An eleventh aspect of the present invention provides a marking method based on the tenth aspect of the present invention, wherein when a design is divided into several blocks and one of the blocks is displayed on the liquid crystal mask, a marking position of the block, currently displayed on the liquid crystal mask, is overlapped with a marking position of a block adjacent to the currently displayed block by a given length of a portion where the outermost pixels have a size which is different from that of the inner pixels of the liquid crystal mask.

According to the fifth and eleventh aspects of the present invention, the controller divides a design into several blocks and controls the liquid crystal mask such that a marking position of a block, currently displayed on the liquid crystal mask, overlaps a marking position of a block adjacent to the currently displayed block by a given length of a portion where the outermost pixels have a size which is different from that of the inner pixels of the liquid crystal mask. The overlap amount of the pixels can be set by taking into account the non-uniformity of positioning accuracy of the liquid crystal mask and the laser beam. This makes it possible to prevent an occurrence of a gap in the joint between adjacent blocks, and hence an occurrence of unmarked portions. Accordingly, high visibility of the marked design can be obtained even if the design is marked in several blocks. This enables the design to be marked in a larger number of blocks, and it is easier to respond to requirements for high resolution (smoothness of the mark). Further, since the greater the number of blocks the smaller the size of the liquid crystal mask can be, the size and the cost of the laser marker can also be reduced.

A second aspect of the present invention provides a liquid crystal mask based on the first aspect of the present invention, wherein the pixels at two outermost sides opposite to each other laterally or vertically are different from the inner pixels at least in either vertical size or lateral size.

A sixth aspect of the present invention provides a liquid crystal laser marker based on the fifth aspect of the present invention, wherein the liquid crystal mask is such that the pixels at the outermost sides, opposite to each other vertically or laterally, are different from the inner pixels at least in either vertical size or lateral size, and when a design is divided into several blocks and one of the blocks is displayed on the liquid crystal mask, the controller controls the liquid crystal mask such that a marking position of the block, currently displayed on the liquid crystal mask, overlaps a marking position of a block adjacent to the currently displayed block by a given length of a portion where the pixels at one of the opposite sides have a size which is different from that of the inner pixels of the liquid crystal mask.

A twelfth aspect of the present invention provides a marking method for making a liquid crystal mask with a plurality of pixels display a design to be marked on workpieces and for transmitting a laser beam through the liquid crystal mask to a workpiece so that the design will be marked on the workpiece, wherein the pixels at the outermost sides, opposite to each other vertically or laterally, are different from the inner pixels at least in either vertical size or lateral size, and when a design is divided into several blocks and one of the blocks is displayed on the liquid crystal mask, a marking position of the block, currently displayed on the liquid crystal mask, is overlapped with a marking position of a block adjacent to the currently displayed block by a given length of a portion where the pixels at one of the outermost sides, opposite to each other vertically or laterally, have a size which is different from that of the inner pixels of the liquid crystal mask.

According to the second, sixth and twelfth aspects of the present invention, the liquid crystal mask is such that the pixels at the outermost sides, opposite to each other vertically or laterally, are different from the inner pixels at least in either vertical size or lateral size, and the controller controls the liquid crystal mask such that a marking position of a block, currently displayed on the liquid crystal mask, overlaps a marking position of a block adjacent to the currently displayed block by a given length of a portion where the outermost pixels have a size which is different from that of the inner pixels. Therefore, high visibility can be obtained even if the design is marked in a number of blocks. This enables the design to be marked in a larger number of blocks. Further, when a design, which extends in one direction, is divided in its longitudinal direction, the overall size of the marked design is not changed from that of the original, thus marking the design with a high tolerance.

A third aspect of the present invention provides a liquid crystal mask based on the first aspect of the present invention, wherein the pixels, at either of the outermost sides opposite to each other vertically or either of the outermost sides opposite to each other laterally, are different from the inner pixels at least in either vertical size or lateral size.

A seventh aspect of the present invention provides a liquid crystal laser marker based on the fifth aspect of the present invention, wherein the liquid crystal mask is such that the pixels, at either of the outermost sides opposite to each other vertically or either of the outermost sides opposite to each other laterally, are different from the inner pixels at least in either vertical size or lateral size, and when a design is divided into several blocks and one of the blocks is displayed on the liquid crystal mask, the controller controls the liquid crystal mask such that a marking position of the block, currently displayed on the liquid crystal mask, overlaps a marking position of a block adjacent to the currently displayed block by a given length of a portion where the pixels at either of the opposite sides have a size which is different from that of the inner pixels of the liquid crystal mask.

A thirteenth aspect of the present invention provides a marking method for making a liquid crystal mask with a plurality of pixels display a design to be marked on workpieces and for transmitting a laser beam through the liquid crystal mask to a workpiece so that the design will be marked on the workpiece, wherein the pixels, at either of the outermost sides opposite to each other vertically or either of the outermost sides opposite to each other laterally, are different from the inner pixels at least in either vertical size or lateral size, and when a design is divided into several blocks and one of the blocks is displayed on the liquid crystal mask, a marking position of the block, currently displayed on the liquid crystal mask, is overlapped with a marking position of a block adjacent to the currently displayed block by a given length of a portion where the outermost pixels at either of the opposite sides have a size which is different from that of the inner pixels of the liquid crystal mask.

According to the third, seventh and thirteenth aspects of the present invention, the liquid crystal mask is such that the pixels, at either of the outermost sides opposite to each other vertically or either of the outermost sides opposite to each other laterally, are different from the inner pixels at least in either vertical size or lateral size, and the controller controls the liquid crystal mask such that a marking position of a block currently displayed on the liquid crystal mask overlaps a marking position of a block adjacent to the currently displayed block by a given length of a portion where the outermost pixels have a size which is different from that of the inner pixels. Therefore, high visibility can be obtained even if the design is marked in several blocks. This enables the design to be marked in a larger number of blocks. Further, when a design, which extends in one direction, is divided in its longitudinal direction, the overall size of the marked design is not changed from that of the original, thus marking the design with a high tolerance.

An eighth aspect of the present invention provides a liquid crystal laser marker for making a liquid crystal mask with a plurality of pixels display a design to be marked on workpieces and for transmitting a laser beam through the liquid crystal mask to a workpiece so that the design will be marked on the workpiece, wherein the liquid crystal laser marker further includes a controller, so that when a design is divided into several blocks and one of the blocks is displayed on the liquid crystal mask, the controller controls the liquid crystal mask such that a marking position of the block, currently displayed on the liquid crystal mask, overlaps a marking position of a block adjacent to the currently displayed block by a given length of a portion corresponding to part of the outermost pixels of the liquid crystal mask.

A fourteenth aspect of the present invention provides a marking method for making a liquid crystal mask with a plurality of pixels display a design to be marked on workpieces and for transmitting a laser beam through the liquid crystal mask to a workpiece so that the design will be marked on the workpiece, wherein when a design is divided into several blocks and one of the blocks is displayed on the liquid crystal mask, a marking position of the block currently displayed on the liquid crystal mask is overlapped with a marking position of a block adjacent to the currently displayed block by a given length of a portion corresponding to part of the outermost pixels of the liquid crystal mask.

According to the eighth and fourteenth aspects of the present invention, the liquid crystal mask is controlled by the controller such that a marking position of a block currently displayed on the liquid crystal mask overlaps a marking position of a block adjacent to the currently displayed block by a given length of a portion corresponding to part of the outermost pixels at either of the opposite sides. The overlap amount can be set by taking into account various factors, such as the play of the second deflector 27X and 27Y, the changes in position of optical elements, and a change of a control signal due to external noise. This makes it possible to prevent an occurrence of a gap in the joint between adjacent blocks, and hence an occurrence of unmarked portions even when all the pixels of the liquid crystal mask have the same size. Accordingly, high visibility of the marked design can be obtained even if the design is marked in a number of blocks, and it is easier to respond to requirements for high resolution (smoothness of the mark). Further, since the greater the number of blocks the smaller the size of the liquid crystal mask can be, the size and the cost of the laser marker can also be reduced.

A ninth aspect of the present invention provides a liquid crystal mask based on the eighth aspect of the present invention, wherein the given length for overlapping the marking positions of adjacent blocks, displayed one at a time on the liquid crystal mask, has units of dot starting from the outermost pixel.

A fifteenth aspect of the present invention provides a marking method based on the fourteenth aspect of the present invention, wherein the given length for overlapping the marking positions of adjacent blocks, displayed one at a time on the liquid crystal mask, has units of dot starting from the outermost pixel.

According to the ninth and fifteenth aspects of the present invention, a part of the outermost pixels of the liquid crystal mask is overlapped in dot unit. Therefore, high visibility of the marked design can be obtained even if the design is marked in a number of blocks. This enables the design to be marked in a larger number of blocks, and it is easier to respond to requirements for high resolution (smoothness of the mark). Further, since the greater the number of blocks the smaller the size of the liquid crystal mask can be, the size and the cost of the laser marker can be also reduced.

BEST MODE FOR CARRYING OUT THE INVENTION

Figure 14:
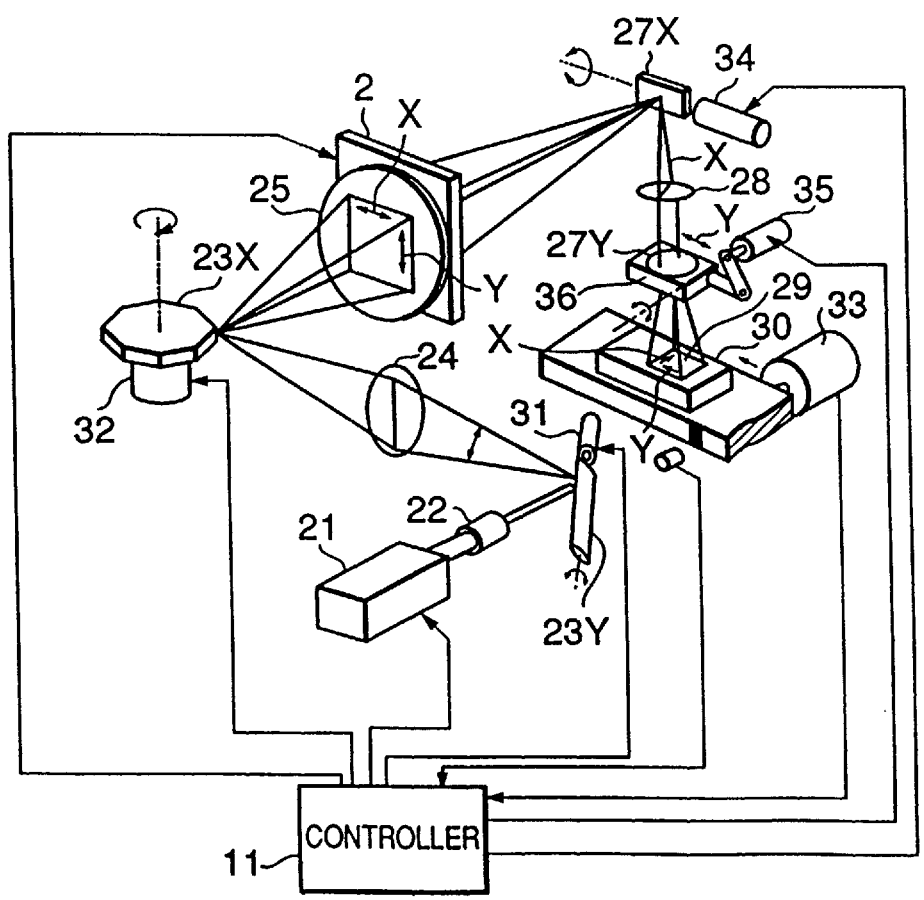
FIG. 14 is a perspective view showing a general structure of an exemplary laser marker.

Referring to FIGS. 1 through 11, a liquid crystal mask, a liquid crystal laser marker, and a marking method using the same according to a first embodiment of the present invention will be described. In the embodiment, liquid crystal masks 2a, 2b or 2c are used, where all or part of the outermost pixels have a size which is larger than that of the other pixels of the liquid crystal mask 2. The liquid crystal laser marker according to the embodiment has the same structure as that of FIG. 14.

Figure 1:
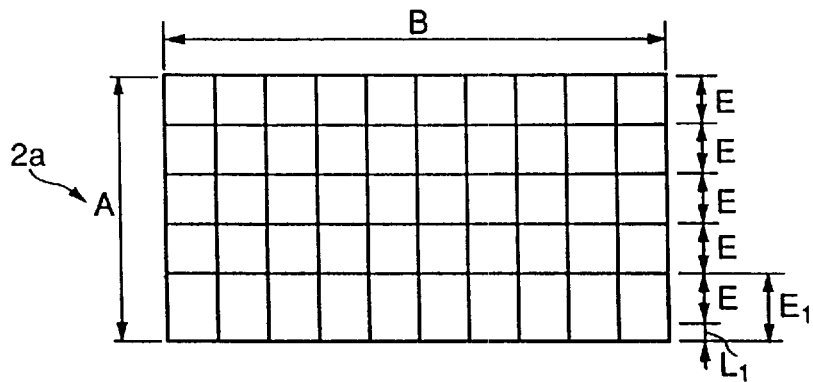
FIG. 1 shows an example of a liquid crystal mask according to a first embodiment of the present invention.
Figure 2:
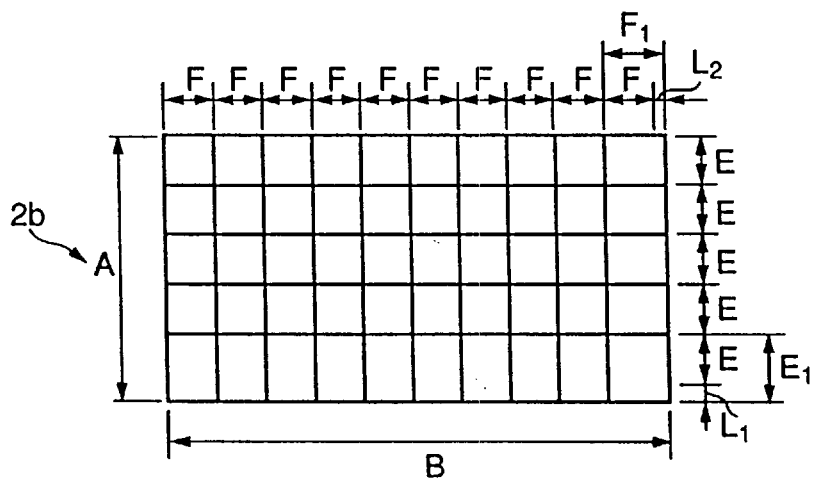
FIGS. 2 and 3 show other examples of liquid crystal masks according to the first embodiment of the present invention.
Figure 3:
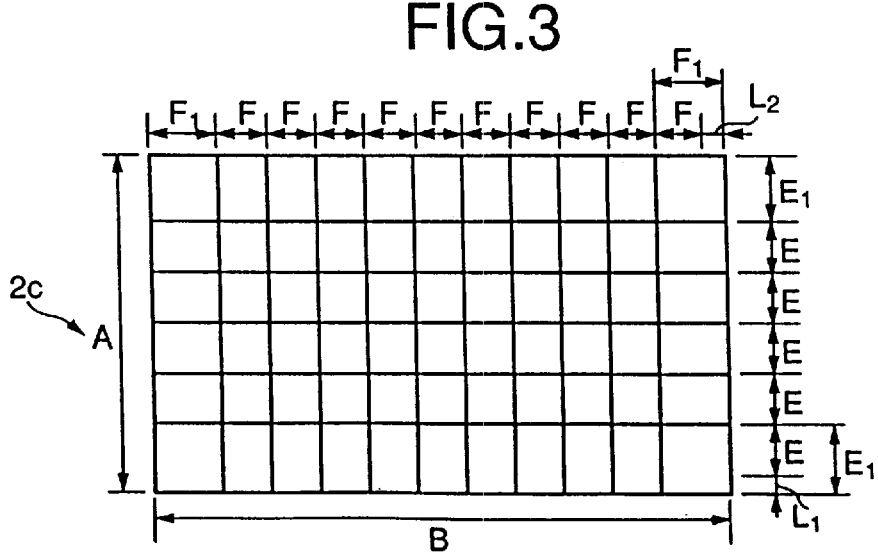

FIGS. 1 to 3 shows the liquid crystal masks 2a, 2b, and 2c used in the embodiment, respectively. Each of the liquid crystal masks is a liquid crystal device serving as a light shutter for transmitting or intercepting a light beam in response to an external signal.

FIG. 1 shows the liquid crystal mask 2a having pixels, only at one side, out of all of the outermost sides of the liquid crystal mask, which are different in size from that of the other pixels. FIG. 2 shows the liquid crystal mask 2b having pixels only at one side in each of two pairs of opposite sides, out of all of the outermost sides of the liquid crystal mask, which are different in size from that of the other pixels.

FIG. 3 shows the liquid crystal mask 2c having pixels at all of the outermost sides of the liquid crystal mask which are different in size from that of the inner pixels. In these cases, the size of the pixels arranged at the corresponding side or sides is set larger than that of the other pixels. The liquid crystal masks 2a, 2b, and 2c have a vertical length A and a horizontal length B. The pixels, with a size larger in the vertical direction, have a vertical length E1 which is longer by a given length L1 than a vertical length E of the other pixels. The pixels, with the size larger in the lateral direction, have a horizontal length F1 which is longer by a given length $L_2$ than a horizontal length F of the other pixels. The lengths $L_1$ and $L_2$ can be set to prevent an occurrence of a gap in each joint by taking into account the maximum gap in the joint caused by various factors, such as the play of the second deflector 27X and 27Y, the changes in position of optical elements, and a change of a control signal due to external noise.

Figure 4:
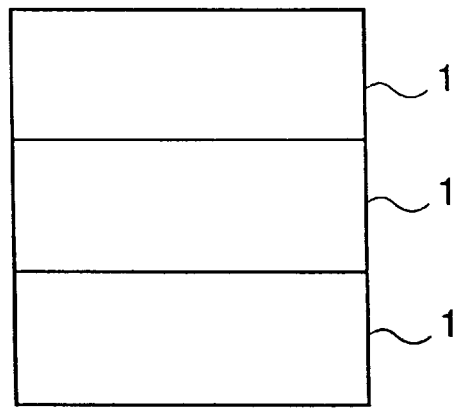
FIG. 4 shows an example of a method for dividing a design into in the first embodiment of the present invention.
Figure 5:
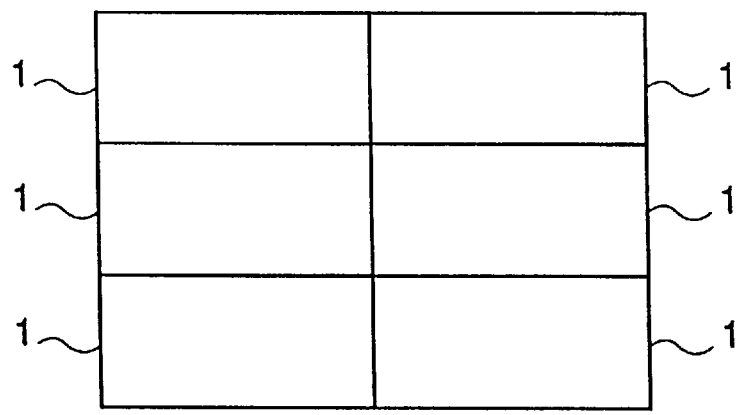
FIG. 5 shows another example of a method for dividing a design into blocks in the first embodiment of the present invention.

On the other hand, a design to be marked is divided into several blocks 1 without overlapping each other. FIG. 4 shows an example of a design which is divided into three blocks 1 in the longitudinal direction. FIG. 5 shows an example of a design divided into three blocks 1 in the vertical direction and two blocks 1 in the lateral direction. Each block 1 is set such that characters or figures of the design can be marked smoothly with the resolution (the number of pixels) of the liquid crystal mask 2 used. It should be noted here that the design needs to be divided into blocks such that at each joint the adjacent blocks 1 never overlap each other.

Next, operation in the first embodiment will be described.

Figure 6:
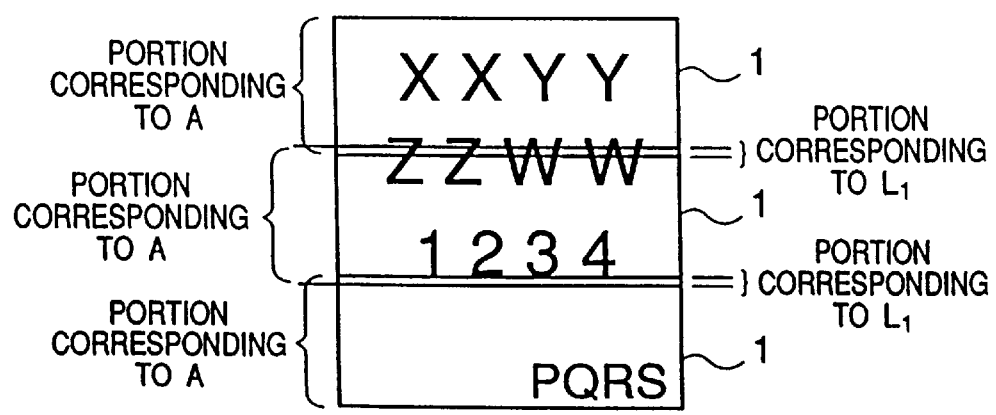
FIG. 6 shows an example of marking positions in the first embodiment of the present invention.

FIG. 6 shows marking positions when the design is marked through the liquid crystal mask 2a having larger-sized pixels only at either of two sides which are opposite to each other vertically or laterally as shown in FIG. 1, in which the design is divided in the longitudinal direction as in FIG. 4. The controller 11 makes the liquid crystal mask 2a display each block 1, resulting from division in the longitudinal direction, and instructs the drive units 32 and 31 for the first deflector 23X and 23Y to output a laser beam so that the liquid crystal mask 2a will be raster scanned with the laser beam. Then the second deflector 27X and 27Y is positioned by the controller 11 such that the marking position faces a marking area corresponding to the block 1 currently displayed. The marking position is determined such that the adjacent blocks 1 overlap each other in the vertical direction by a portion corresponding to the given length L1 of the liquid crystal mask 2a.

Figure 7:
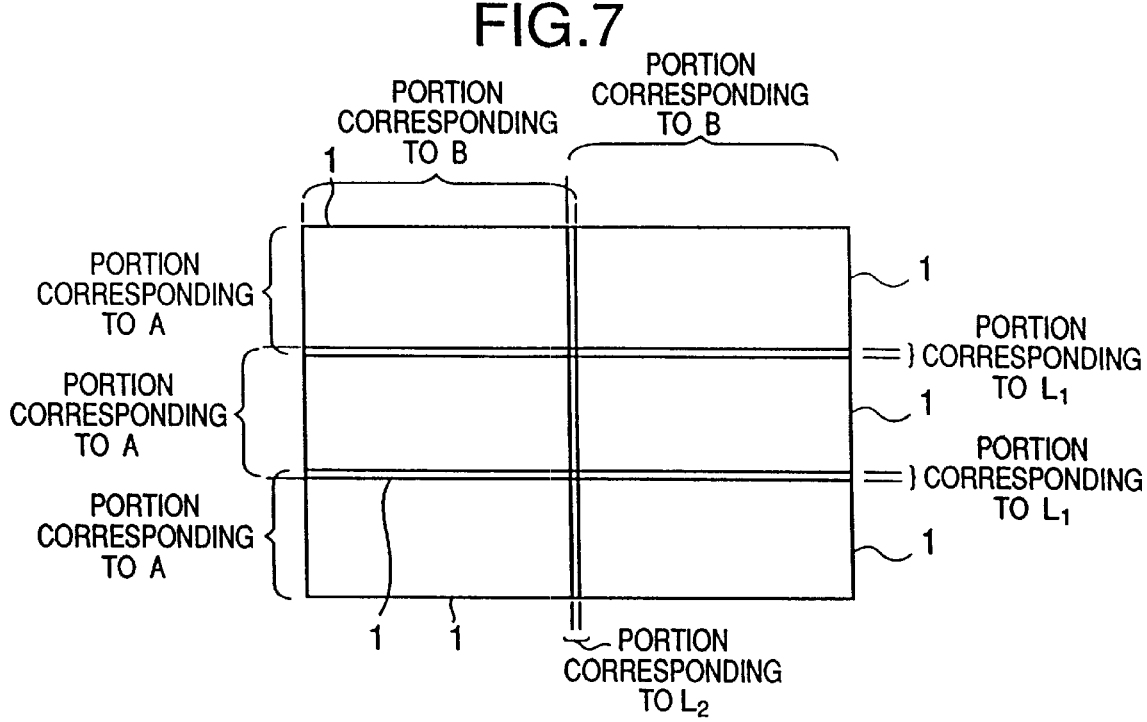
FIG. 7 shows another example of marking positions in the fir embodiment of the present invention.

FIG. 7 shows marking positions when the design is marked through the liquid crystal mask 2b having larger-sized pixels only at one side of each of two pairs of the opposite sides as shown in FIG. 2, in which the design is divided in the vertical and lateral directions as in FIG. 5. The controller 11 makes the liquid crystal mask 2b display each block 1, resulting from division in the vertical and lateral directions, and instructs the drive units 32 and 31 for the first deflector 23X and 23Y to output a laser beam so that the liquid crystal mask 2b will be raster scanned with the laser beam. Then the second deflector 27X and 27Y is positioned by the controller 11 such that the marking position faces a marking area corresponding to the block 1 currently displayed. The marking position is determined such that the adjacent blocks 1 overlap each other in the vertical direction by a portion corresponding to the given length L1 of the liquid crystal mask 2b and in the lateral direction by a portion corresponding to the given length $L_2$ of the liquid crystal mask 2b.

Figure 8:
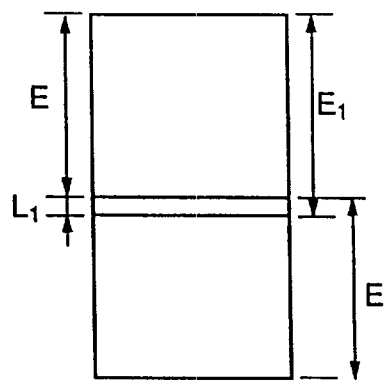
FIG. 8 shows an example of an overlapping portion between adjacent blocks marked by the liquid crystal mask according to the first embodiment of the present invention.

Such an overlapping portion between adjacent blocks 1 will be described in detail below with reference to FIG. 8. FIG. 8 shows an overlapping portion between adjacent blocks 1 displayed one at a time on the liquid crystal mask 2a or 2b. In the case where the liquid crystal mask 2a is used to overlap the adjacent blocks 1 in the vertical direction, the marking position is determined such that a portion corresponding to the given length L1, at the lower end and within the length E1 of the lowermost row of pixels of the liquid crystal mask on which a block 1 is displayed, is overlapped with part of the length E of the uppermost row of pixels of the liquid crystal mask on which a block 1 adjacent to and below the above block 1 is displayed. Similarly, in the case the liquid crystal mask 2b is used to overlap the adjacent blocks 1 in the lateral direction, the marking position is determined such that a portion corresponding to the given length $L_2$ at the right end and within the length F1 of the rightmost row of pixels of the liquid crystal mask on which a block 1 is displayed is overlapped with part of the length F of the leftmost row of pixels of the liquid crystal mask on which a block 1 adjacent to and to the right of the above block 1 is displayed.

Figure 9:
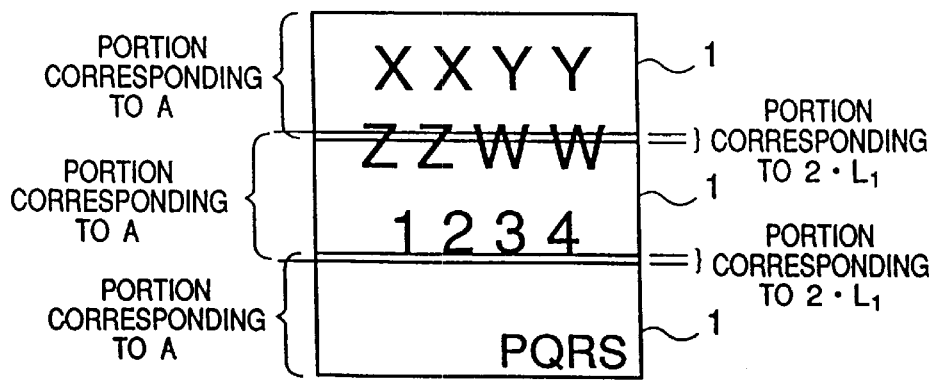
FIGS. 9 and 10 each show another example of marking positions in the first embodiment of the present invention.
Figure 10:
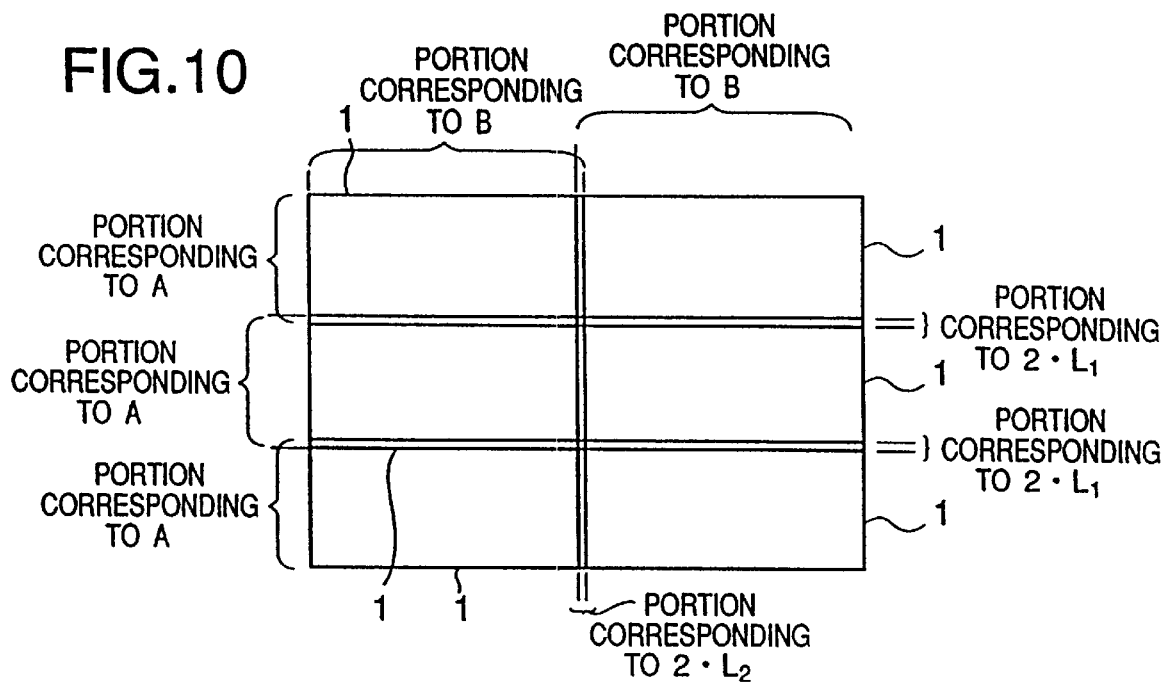

On the other hand, in the case of the liquid crystal mask 2c having larger-sized pixels at two pairs of opposite sides as shown in FIG. 3, the marking position is determined as in FIG. 9 or 10. FIG. 9 shows marking positions when the design is divided in the longitudinal positions when the design is divided in direction as in FIG. 4. FIG. 10 shows marking positions when the design is divided in the vertical and lateral directions as in FIG. 5. When the design is divided in the longitudinal direction, there can be used a liquid crystal mask having larger-sized pixels at the sides opposite to each other either vertically or laterally. The controller 11 makes the liquid crystal mask 2c display each block 1 of a design which is divided in the longitudinal direction or of a design which is divided in the vertical and lateral directions, and provides a laser beam for raster scanning of the liquid crystal mask 2c with the first deflector 23X and 23Y. Then the second deflector 27X and 27Y is positioned under control such that the marking position faces a marking area corresponding to the block 1 currently displayed. The marking position is determined such that the adjacent blocks 1 overlap each other in the vertical direction by a portion corresponding to a length $2\hat{u}L_1$ that is twice as long as the given length $L_1$ of the liquid crystal mask 2c, and in the lateral direction by a portion corresponding to a length $2\hat{u}L_2$ that is twice as long as the given length $L_2$ of the liquid crystal mask 2c.

Figure 11:
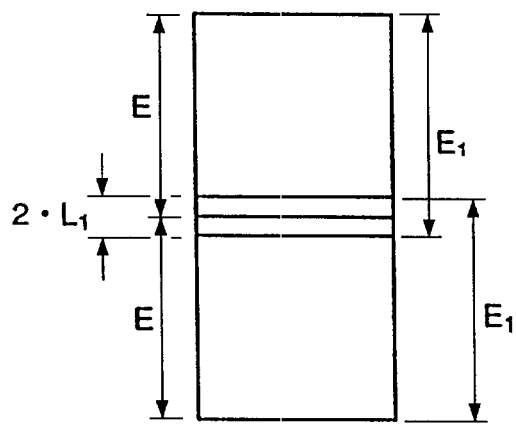
FIG. 11 shows another example of an overlapping portion between adjacent blocks marked by the liquid crystal mask according to the first embodiment of the present invention.

Such an overlapping portion between adjacent blocks 1 will be described in detail below with reference to FIG. 11. FIG. 11 shows an overlapping portion between adjacent blocks 1 displayed one at a time on the liquid crystal mask 2c. When the adjacent blocks 1 overlap each other in the vertical direction, the marking position is determined such that a portion corresponding to the length $2\hat{u}L_1$ at the lower end and within the length E1 of the lowermost row of pixels of the liquid crystal mask on which a first block 1 is displayed is overlapped with the length $2\hat{u}L_1$ at the upper end and within the length E1 of the uppermost row of pixels of the liquid crystal mask on which a block 1 adjacent to and below the first block 1 is displayed. Similarly, when the adjacent blocks 1 overlap each other in the lateral direction, the marking position is determined such that a portion corresponding to the length $2\grave{u}L_2$ at the right end and within the length $F_1$ of the rightmost row of pixels of the liquid crystal mask on which a first block 1 is displayed is overlapped with the length $2\grave{u}L_2$ at the left end of the leftmost row of pixels of the liquid crystal mask on which a block 1 adjacent to and to the right of the first block 1 is displayed.

Although the above embodiment teaches that the vertical length $E_1$ of the pixels of all of the outermost pixels having a different size is set longer by the given length $L_1$ than the vertical length E of the other pixels, the present invention is not limited by the embodiment and it can be set shorter than the length E, e.g., to a length equal to the given length $L_1$ (where $L_1$<E). The liquid crystal mask can be such that the pixels having the length $E_1$ (longer than the length E by the given length $L_1$) are arranged at one of the opposite sides and the pixels having the length $L_1$ (where $L_1$<E) is arranged at the other side. Even in this case, the adjacent blocks 1 are overlapped in the same manner as in FIGS. 8 and 11. Stated more particularly, when the pixel size at one of the opposite sides is different from that at the other side, i.e., when the one is $E_1$ and the other is $L_1$, a portion corresponding to the given length $L_1$ of the pixel at one of the opposite sides of the liquid crystal mask on which a block 1 is displayed is overlapped with the adjacent block 1.

Similarly, when the pixels at two pairs of opposite sides are different in size from the other pixels, a portion corresponding to the length $2\grave{u}L_1$ of the pixels at the opposite sides of the liquid crystal mask on which a block 1 is displayed is overlapped with the adjacent block 1.

Although the above embodiment also teaches that the horizontal length $F_1$ of the pixels different in size is longer by the given length $L_2$ than the horizontal length F of the other pixels, the present invention is not limited by the embodiment and it can be set shorter than the length F, e.g., to a length equal to the given length $L_2$ (where $L_2$ <F). The liquid crystal mask can be such that the pixels having the length $F_1$ (longer than the length F by the given length $L_2$) is arranged at one of the opposite sides and the pixels having the length $L_2$ (where $L_2$ <F) is arranged at the other side. Even in this case, the adjacent blocks 1 are overlapped in the same manner as in FIGS. 8 and 11.

According to such structures of the liquid crystal masks, the adjacent blocks 1 are overlapped exactly in the joint even when an inconvenient thing occurs, such as the play of the second deflector 27X and 27Y, changes in the position of optical elements, and a change of a control signal due to external noise. This makes it possible to eliminate a portion in which no laser beam is irradiated, and hence to obtain high visibility of the overall design. Further, when a design is divided into several blocks in its longitudinal direction, the longitudinal size of the marked figure can be the same as that of the original design, so that a yield of marking in the laser marker increases, thus improving its productivity.

Even when the design is divided into several blocks 1 without overlapping each other, since an overlapping portion is provided in advance in a marking area, it is not necessary to increase the accuracy with which the marking position of each block is controlled as long as the overlapping portion is within the tolerance. Further, since no gap occurs in the joint between adjacent blocks, the design can be marked in a larger number of blocks. It is therefore possible to make each block smaller when high resolution (smoothness of the mark) is required, and hence easier to respond to requirements for high resolution. Furthermore, the size of a liquid crystal mask to be used can be minimized by reducing the number of pixels of the liquid crystal mask, thereby reducing the size and the cost of the laser marker.

Figure 15:
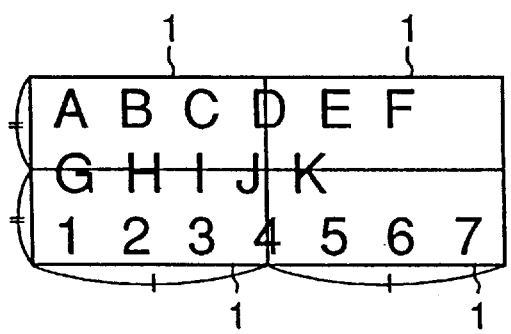
FIG. 15 is a schematic diagram showing a liquid crystal mask.
Figure 16:
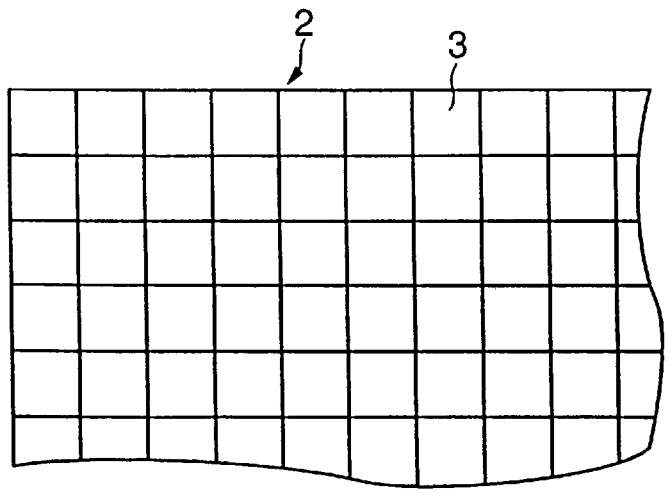
FIG. 16 is a schematic diagram showing an example of a method dividing a design into blocks in the conventional art.
Figure 17A:
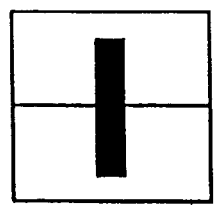
FIG. 17A and 17B are explanatory drawings each showing a joint between blocks in the conventional art.
Figure 17B:
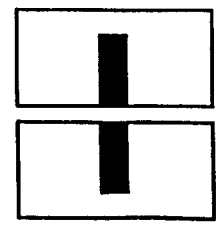

A second embodiment will be described next. In this embodiment, a liquid crystal mask 2 has pixels 3 of an identical size as shown in FIG. 15. The liquid crystal laser marker according to this embodiment has the same structure as that of FIG. 14.

Figure 12:
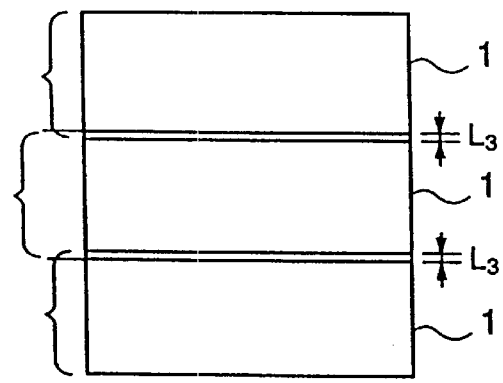
FIG. 12 shows an example of a method for dividing a design into blocks and for marking positions in a second embodiment of the present invention.
Figure 13:
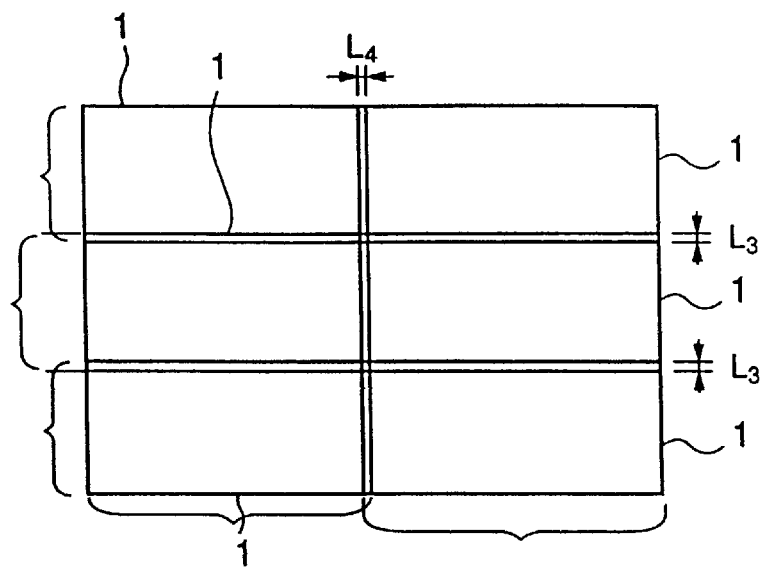
FIG. 13 shows another example of a method for dividing a design into blocks and for marking positions in the second embodiment of the present invention.

FIGS. 12 and 13 each show an example of a design divided into several blocks 1 in the longitudinal direction or in the vertical and lateral directions. In such examples, overlapping portions of given lengths $L_3$ and $L_4$ are provided in a vertical joint or a horizontal joint between adjacent blocks 1, respectively. The given lengths $L_3$ and $L_4$ can be set to prevent occurrence of a gap in each joint by taking into account the maximum gap in the joint caused by various factors, such as the play of the second deflector 27X and 27Y, the changes in the position of optical elements, and a change of a control signal due to external noise. Each block 1 is set such that the characters or figures of the design can be marked smoothly with the resolution (the number of pixels) of the liquid crystal mask 2 used.

Next, operation in the second embodiment will be described.

When a design is divided in the longitudinal direction as shown in FIG. 12, the marking positions are controlled in the following manner. The controller 11 makes the liquid crystal mask 2 display each block 1, representing divisions in the longitudinal direction, and provides a laser beam for raster scanning of the liquid crystal mask 2 with the first deflector 23X and 23Y. Then the second deflector 27X and 27Y is positioned by the controller 11 such that the current marking position faces a marking area corresponding to the block 1 currently displayed. The marking position is determined such that the adjacent blocks 1 overlap each other in the vertical direction by the given length $L_3$.

As shown in FIG. 13, when a design is divided in the vertical and lateral directions, the controller 11 makes the liquid crystal mask 2 sequentially display each block 1, and provides a laser beam for the raster scanning of the liquid crystal mask 2 with the first deflector 23X and 23Y. Then the second deflector 27X and 27Y is positioned by the controller 11 such that the current marking position faces a marking area corresponding to the block 1 currently displayed. The marking position is determined such that the adjacent blocks 1 overlap each other in the vertical direction by the given length $L_3$ and in the lateral direction by the given length $L_4$.

The lengths $L_3$ and $L_4$ of overlapping portions between adjacent blocks 1 can be set to a size in pixel unit (dot unit) or to a length shorter than the size of one pixel.

According to such structures, the adjacent blocks 1 are overlapped exactly in the joint even when an inconvenient thing occurs, such as the play of the second deflector 27X and 27Y, the changes in the position of optical elements, and a change of a control signal due to external noise. This makes it possible to eliminate a portion in which no laser beam is irradiated, and hence to obtain high visibility of the overall design. Further, when a design is divided into several blocks in its longitudinal direction, the longitudinal size of the marked figure can be the same as that of the original design, so that a yield of marking in the laser marker increases, thus improving its productivity.

Since an overlapping portion between adjacent blocks is provided in advance, it is not necessary to increase the accuracy with which the marking position of each block is controlled as long as the overlapping portion is within the tolerance. Further, since no gap occurs in the joint between adjacent blocks, the design can be marked in a larger number of blocks. It is therefore possible to make each block smaller when high resolution (smoothness of the mark) is required, and hence easier to respond to requirements for high resolution. Furthermore, the size of a liquid crystal mask to be used can be minimized by reducing the number of pixels of the liquid crystal mask, thereby reducing the size and the cost of the laser marker.

INDUSTRIAL APPLICABILITY

According to the present invention, no gap occurs in the joint between adjacent blocks when a design is marked in several blocks. Therefore, the present invention is effectively applied to a liquid crystal mask, a liquid crystal laser marker, and a marking method using the same, in which high visibility of the marked design is obtained without any break in the character or figure.

What is claimed is:

1. A liquid crystal mask with a plurality of pixels, said liquid crystal mask being suitable for mounting in a liquid crystal laser marker for making the pixels display a design to be marked on workpieces and for transmitting a laser beam through the pixels to a workpiece so that the design displayed on the pixels will be marked on the workpiece, said liquid crystal mask being a liquid crystal device having a plurality of outer pixels arranged along outermost sides of said liquid crystal device and a plurality of inner pixels arranged inwardly of said outer pixels, in which the outer pixels of at least a portion of the outermost sides have a size which is different from that of the inner pixels.

2. A liquid crystal mask according to claim 1, wherein the outer pixels at two outermost sides, which are opposite to each other laterally, are different from the inner pixels at least in lateral size.

3. A liquid crystal mask according to claim 1, wherein the outer pixels at two outermost sides, which are opposite to each other either vertically, are different from the inner pixels at least in vertical size.

4. A liquid crystal mask according to claim 1, wherein the pixels at either one of the outermost sides which are opposite to each other vertically are different from the inner pixels at least in vertical size.

5. A liquid crystal mask according to claim 1, wherein the pixels at either one of the outermost sides which are opposite to each other laterally are different from the inner pixels at least in lateral size.

6. A liquid crystal laser marker comprising:
a liquid crystal mask having a plurality of outer pixels arranged along outermost sides of said liquid crystal mask and a plurality of inner pixels arranged inwardly of said outer pixels, in which the outer pixels of at least a portion of the outermost sides have a size which is different from that of the inner pixels;
whereby said liquid crystal laser marker can display on said liquid crystal mask a design to be marked on workpieces and transmit a laser beam through said liquid crystal mask to a workpiece so that the design will be marked on the workpiece.

7. A liquid crystal laser marker in accordance with claim 6, further comprising a controller, so that when a design is divided into several blocks and one of the blocks is displayed on said liquid crystal mask, said controller controls said liquid crystal mask such that a marking position of a block currently displayed on said liquid crystal mask overlaps a marking position of a block adjacent to the currently displayed block by a given length of a portion of the outer pixels having a size which is different from that of the inner pixels of said liquid crystal mask.

8. A liquid crystal laser marker in accordance with claim 7, wherein said liquid crystal mask is such that the outer pixels, at the outermost sides which are opposite to each other vertically or laterally, are different from the inner pixels in at least one of vertical size and lateral size, and when a design is divided into several blocks and one of the blocks is displayed on said liquid crystal mask, the controller controls said liquid crystal mask such that a marking position of a block currently displayed on said liquid crystal mask overlaps a marking position of a block adjacent to the currently displayed block by a given length of a portion where the outer pixels, at one of the opposite outermost sides, have a size which is different from that of the inner pixels of said liquid crystal mask.

9. A liquid crystal laser marker according to claim 7, wherein said liquid crystal mask is such that the outer pixels, at either of the outermost sides which are opposite to each other vertically or at either of the outermost sides which are opposite to each other laterally, are different from the inner pixels at least in either vertical size or lateral size, and when a design is divided into several blocks and one of the blocks is displayed on said liquid crystal mask, the controller controls said liquid crystal mask such that a marking position of a block currently displayed on said liquid crystal mask overlaps a marking position of a block which is adjacent to the currently displayed block by a given length of a portion where the outer pixels at either of the opposite sides have a size which is different from that of the inner pixels of said liquid crystal mask.

10. A liquid crystal laser marker comprising:
a liquid crystal mask having a plurality of outer pixels arranged along outermost sides of said liquid crystal mask and a plurality of inner pixels arranged inwardly of said outer pixels; and
a controller, for displaying on said liquid crystal mask a design to be marked on workpieces and for transmitting a laser beam through said liquid crystal mask to a workpiece so that the design will be marked on the workpiece, so that when a design is divided into several blocks and one of the blocks is displayed on said liquid crystal mask, said controller controls said liquid crystal mask such that a marking position of a block currently displayed on said liquid crystal mask overlaps a marking position of a block adjacent to the currently displayed block by a given length of a portion corresponding to part of the outer pixels of said liquid crystal mask.

11. A liquid crystal laser marker in accordance with claim 10, wherein the given length has units of dot starting from an outermost pixel.

12. A marking method comprising the steps of:
making a liquid crystal mask display a design to be marked on workpieces, said liquid crystal mask having a plurality of outer pixels arranged along outermost sides of said liquid crystal mask and a plurality of inner pixels arranged inwardly of said outer pixels, wherein in at least a portion of the outermost sides the outer pixels have a size which is different from that of the inner pixels; and
transmitting a laser beam through the liquid crystal mask to a workpiece so that the design will be marked on the workpiece without distortion of outermost optics.

13. A marking method in accordance with claim 12, further comprising the steps of:

dividing a design into several blocks;

displaying the blocks one by one on said liquid crystal mask;

overlapping a marking position of a block currently displayed on said liquid crystal mask with a marking position of a block which is adjacent to the currently displayed block by a given length of a portion where the outer pixels have a size which is different from that of the inner pixels.

14. A marking method comprising:

dividing into several blocks a design to be marked on workpieces;

providing a liquid crystal mask having a plurality of outer pixels arranged along outermost sides of said liquid crystal mask and a plurality of inner pixels arranged inwardly of said outer pixels, wherein the outer pixels of at least one of the outermost sides, which are opposite to each other vertically or laterally, are different from the inner pixels at least in either vertical size or lateral size;

making said liquid crystal mask display said blocks one by one; and transmitting a laser beam through the liquid crystal mask to a workpiece such that a marking position of a block currently displayed on said liquid crystal mask is overlapped with a marking position of a block which is adjacent to the currently displayed block by a given length of a portion where the outer pixels of said at least one of the outermost sides which are opposite to each other vertically or laterally have a size which is different from that of the inner pixels, so that the design will be marked on the workpiece.

15. A marking method comprising the steps of:

dividing into several blocks a design to be marked on workpieces;

providing a liquid crystal mask having a plurality of outer pixels arranged along outermost sides of said liquid crystal mask and a plurality of inner pixels arranged inwardly of said outer pixels, wherein the outer pixels, at either one of the outermost sides which are opposite to each other vertically or either of the outermost sides opposite to each other laterally, are different from the inner pixels at least in either vertical size or lateral size, making said liquid crystal mask display said blocks one by one; and transmitting a laser beam through the liquid crystal mask to a workpiece such that a marking position of a block currently displayed on said liquid crystal mask is overlapped with a marking position of a block which is adjacent to the currently displayed block by a given length of a portion where the outer pixels at either of the opposite sides have a size which is different from that of the inner pixels, so that the design will be marked on the workpiece.

16. A marking method comprising the steps of:

dividing into several blocks a design to be marked on workpieces;

providing a liquid crystal mask having a plurality of outer pixels arranged along outermost sides of said liquid crystal mask and a plurality of inner pixels arranged inwardly of said outer pixels;

making said liquid crystal mask display said blocks one by one; and transmitting a laser beam through the liquid crystal mask to a workpiece such that a marking position of a block currently displayed on said liquid crystal mask is overlapped with a marking position of a block which is adjacent to the currently displayed block by a given length of a portion corresponding to part of the outer pixels, so that the design will be marked on the workpiece.

17. A marking method in accordance with claim 16, wherein the given length has units of dot starting from an outer pixel.

* * * * *